United States Patent [19]

Winkler et al.

[11] Patent Number: 5,023,983
[45] Date of Patent: Jun. 18, 1991

[54] DEVICE FOR PRODUCING MOUNTING BORES OR VALVE BORES IN A WHEEL DISK

[75] Inventors: Hans-Henning Winkler, Tuttlingen; Eugen Rütschle, Mühlheim, both of Fed. Rep. of Germany

[73] Assignee: Chiron-Werke GmbH & Co. KG, Tuttlingen, Fed. Rep. of Germany

[21] Appl. No.: 255,904

[22] Filed: Oct. 11, 1988

[30] Foreign Application Priority Data

Oct. 23, 1987 [DE] Fed. Rep. of Germany ....... 3735858

[51] Int. Cl.⁵ .......................... B23B 7/00; B23C 1/14; B23P 23/00
[52] U.S. Cl. .................................... 29/27 R; 408/69; 409/221; 409/224
[58] Field of Search .................. 29/568, 159.01, 27 C, 29/159 R, 26 A, 27 R, 26 R; 409/234, 224, 235, 131, 132, 221; 408/1, 69; 73/49.8

[56] References Cited

U.S. PATENT DOCUMENTS

| | | | |
|---|---|---|---|
| 3,822,959 | 7/1974 | Tabard | 409/224 X |
| 3,998,127 | 12/1976 | Romeu | 409/224 |
| 4,279,287 | 7/1981 | Daudi et al. | 29/159 R X |
| 4,304,034 | 12/1981 | Trevarrow | 29/159.01 |
| 4,432,227 | 2/1984 | Dunn | 73/498 |
| 4,637,107 | 1/1987 | Romeu | 29/27 C |
| 4,664,570 | 8/1987 | Tsukiji et al. | 409/224 |
| 4,712,282 | 12/1987 | Romeu | 29/27 C |

FOREIGN PATENT DOCUMENTS

| | | |
|---|---|---|
| 877529 | 9/1952 | Fed. Rep. of Germany . |
| 3624284 | 7/1986 | Fed. Rep. of Germany . |
| 200715 | 9/1981 | German Democratic Rep. . |
| 8300828 | 9/1982 | PCT Int'l Appl. . |

Primary Examiner—William Briggs
Attorney, Agent, or Firm—Rosenblum, Parish & Bacigalupi

[57] ABSTRACT

A device serves for producing mounting bores or valve bores in a wheel disk and/or a rim of a wheel of a motor vehicle. The bores are at least partly inclined relative to a center axis of the wheel. A fixture serves for mounting the wheel. A motor-operated tool is used for producing the bores.

In order to achieve minimum machining times, means are provided for pivoting the said holding fixture, with the said wheel mounted therein, relative to a work table about an axis extending at a certain inclination relative to the center axis of the said wheel.

15 Claims, 6 Drawing Sheets

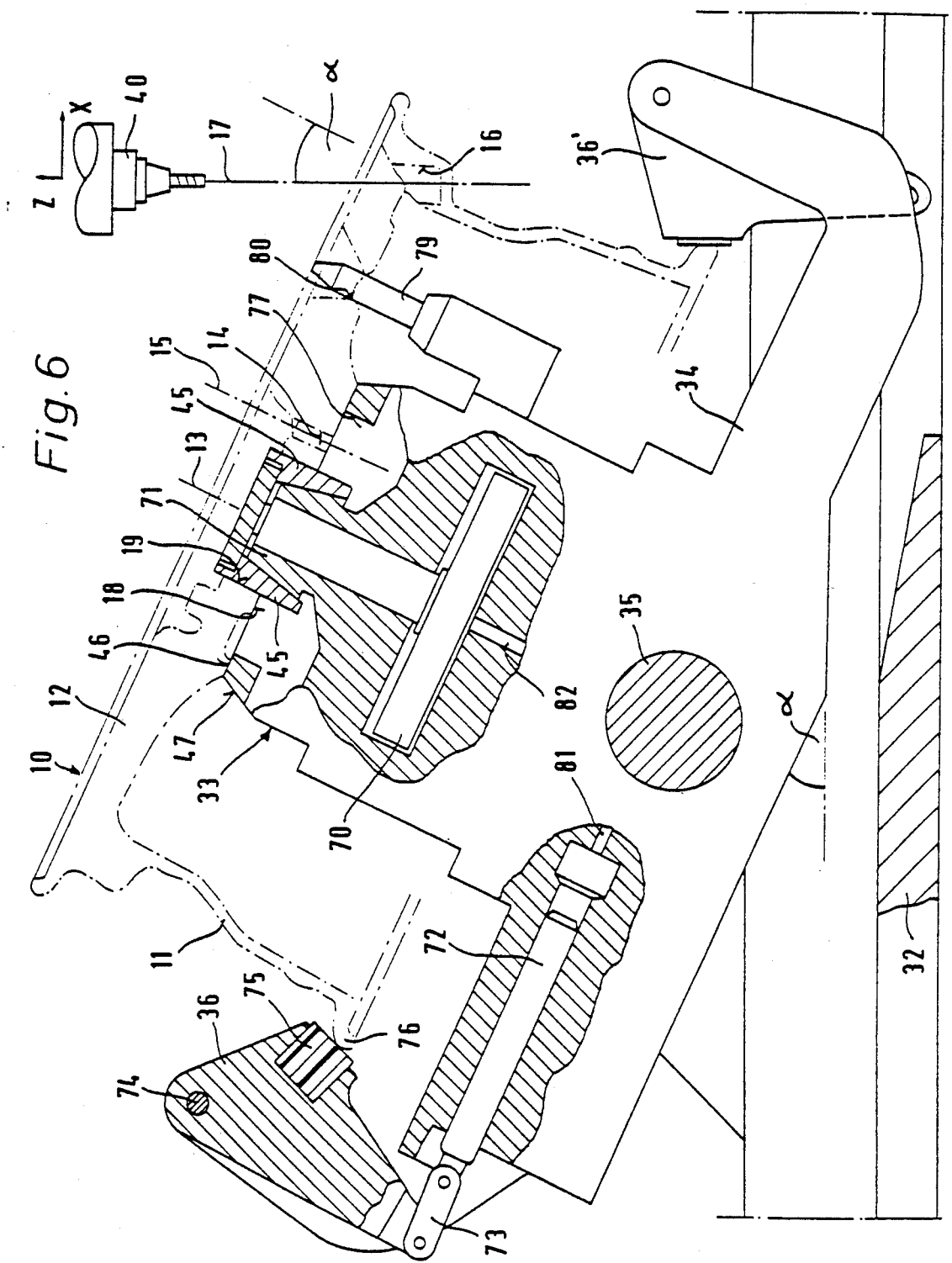

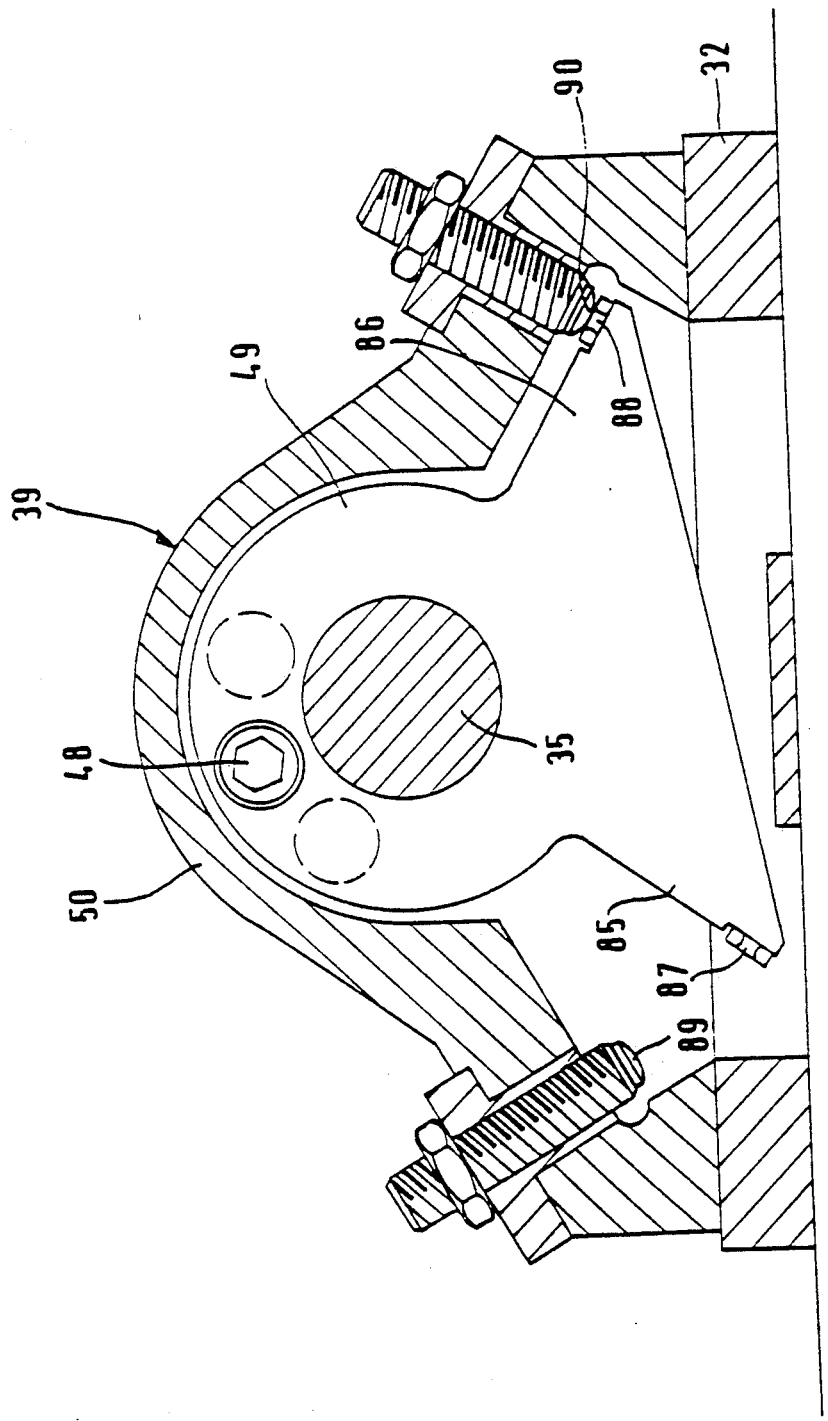

DEVICE FOR PRODUCING MOUNTING BORES OR VALVE BORES IN A WHEEL DISK

The present invention relates to a device for producing mounting bores or valve bores in a wheel disk and/or a rim of a wheel of a motor vehicle, which bores are at least partly inclined relative to a center axis of the wheel, the device comprising a fixture for mounting the wheel and a motor-operated tool.

It has been previously known in connection with the production of motor vehicle wheels to produce the bores intended for mounting and centering the wheel, compensating an existing imbalance, or for receiving a valve, in the blank, i.e. the assembly comprising the wheel disk and the rim, by means of a motor-operated tool. Most of the described bores, in particular the mounting bores, centering bores or balancing bores, extend coaxially to each other and in parallel to the center axis of the wheel. It is, therefore, possible to produce these coaxial bores by means of the tool with the wheel mounted in a single position. However, known motor vehicle wheels are provided with still other bores which extend at a certain angle relative to the center axis of the wheel. In the first line, one should mention here the bore intended for receiving the valve which—for constructional reasons—is arranged in the area of the rim flange and at an angle of, for example, 30° relative to the center axis of the wheel.

In order to produce these inclined bores in the wheel, it has been necessary heretofore to apply first those bores which extend in parallel to the center axis of the wheel, to change thereafter the mounting position of the wheel and to produce finally the inclined bores by a second operating cycle.

However, the method of subdividing the processing operation of the wheels, as regards the production of the bores, into two operating cycles is connected with the substantial disadvantage that the total processing time for the wheel is considerably increased because changing the mounting position requires not only additionally apparatus input, but also considerable additional working time.

Now, it is the object of the present invention to improve a device of the type described above in such a manner that the total processing time is reduced and the highest degree of automation of the processing operations for the wheel is rendered possible.

This object is achieved according to the invention by the fact that means are provided for pivoting the holding fixture, with the wheel mounted therein, relative to a work table about an axis extending at a certain inclination relative to the center axis of the wheel.

This solves the object underlying the invention fully and perfectly because the wheel may now remain in the same mounting position and the re-orientation of the wheel required for providing the wheel with a desired number of bores inclined at different angles is effected by pivoting only the holding fixture.

Since the pivoting means used may be operated by some external power source, the pivoting operation may also be carried out automatically and may, consequently, be integrated into the numerical control of a machine tool. This opens up the possibility to carry out the whole processing operation of the wheel in a so-called machining center, i.e. a machine tool which is essentially adapted for milling and drilling and whose spindle is usually arranged for being displaced along three Cartesian coordinate directions. The wheel then only has to be mounted in the holding fixture, whereafter the machining center carries out at first all bores in one mounting position and then, after the holding fixture has been pivoted correspondingly, all bores extending at some inclination.

It is obvious that the processing times can be notably reduced in this manner.

According to a preferred embodiment of the invention, the inclined axis intersects the center axis and extends at a right angle relative to the latter.

The variant of the invention, where the geometrical locus of the inclined bore coincides with the pivoting direction, provides the advantage that here again the movements are reduced to a Cartesian coordinate system which insures particularly good compatibility with the usual machining centers described above. In particular, it is possible in this manner to arrange the wheels with their center axis extending in the vertical direction and the inclined axis extending in a horizontal direction. The desired bores can then be produced in a simple manner by a machining center which has its tool axis likewise extending in the vertical direction.

According to another preferred embodiment of the invention, the holding fixture is provided with a reference surface extending radially to the center axis and intended for being brought into contact with a reference plane of the mounted wheel, which likewise extends radially to the center axis.

This feature provides the advantage that the contact between the two reference surfaces guarantees correct adjustment of the wheel in the axial direction, which is particularly important with a view to ensuring that after the defined pivoting movement of the wheel the position of the inclined bore can be located exactly.

According to a preferred improvement of this variant, pressing means are provided for pressing the reference plane of the wheel upon the reference surface.

This feature provides the advantage that any loss of adjustment of the wheel is safely prevented during processing of the wheel.

Preferably, the pressing means are designed in this case as holding-down device which engages the rim flange of the wheel at a point spaced from the reference plane.

This feature provides the advantage that the wheel can be positioned without any problems because after positioning of the wheel the holding-down device engages only the periphery, i.e. the rim flange, of the wheel to press the latter upon the reference surface.

In this connection, it is further preferred that two holding-down devices are used for engaging the rim flange at two diametrically opposite positions.

This arrangement provides the advantage that the wheel is safely retained on the reference surface with a minimum number of holding-down devices.

It is further preferred in the case of this variant of the invention that the holding-down device can be pivoted about an axis extending in parallel to the inclined axis, and can be operated by means of a first piston-and-cylinder unit.

This feature provides the advantage that when the wheel is being positioned in the holding fixture, the holding-down devices can be pivoted to clear the path of the wheel fully so that in this respect, too, the wheel can be positioned in the holding fixture without any problems. By aligning the axes in the described manner, a simple movement is achieved for the holding-down devices, and their operation by means of piston-and-cylinder units enables the mounting process to be further automated.

In this connection, an arrangement is particularly preferred where the holding-down devices and the first piston-and-cylinder unit are integrated in the holding fixture and can be pivoted together therewith.

Such an arrangement provides the advantage that a particularly compact design is achieved and that the hose connections of the piston-and-cylinder unit are also reduced to a minimum.

In addition, a good effect is achieved according to the invention also when an expansion member projects axially from the reference surface and engages a central opening of the mounted wheel, preferably in a form-locking manner, so as to fix the wheel radially and axially in the expanded condition.

This feature provides the advantage that in addition to the reference surface provided for defining and guaranteeing the axial position of the wheel, the latter's radial position can be defined and fixed, too, it being possible to provide the expansion member, and the fixation ensured by the latter, either alternatively or in addition to the holding-down devices described above.

In the case of this variant of the invention, too, the expansion member can be operated preferably by a second piston-and-cylinder unit.

This arrangement provides again the advantage that the respective movements can be controlled in a simple manner by an external power source and that, accordingly, the control can be integrated into the numerical control of the machining center.

According to a further preferred variant of this embodiment, the piston-and-cylinder units are connected to common fluid lines.

This feature provides the advantage that both the holding-down devices and the expansion member can be operated by a common actuating element. This reduces the apparatus input to a minimum and has the effect that the mounted wheel can be fixed radially and axially by actuating the expansion member and the holding-down devices preferably simultaneously.

Further it is preferred according to the invention that the holding fixture is provided with axial openings arranged in the reference surface at the positions of the bores of the mounted wheel and that the clear cross-section of the said openings is bigger than that of the said bores.

This feature provides the advantage that tools used for working the bores may have not only any desired axial dimensions, but also a considerable radial extension. This may be of advantage in particular when a countersunk bore is to be provided also at the surface of the wheel opposite the tool holder, in which case one preferably uses tools which are passed through a narrower cross-section of the bore and are then expanded radially, or radially displaced at the rear of the workpiece.

Another preferred embodiment of the invention is characterized by the fact that the holding fixture is provided with an eccentric, axially extending centering arbor engaging a coacting eccentric, axial opening in the wheel, for defining a rotary position of the wheel relative to the holding fixture.

This feature provides the advantage that the wheels can be mounted on the holding fixture only in one predetermined angular position so that faulty machining operations are definitely excluded.

According to another preferred embodiment of the invention, the holding fixture is fixed against relative rotation on a shaft aligned with the inclined axis, a crank is also fixed against relative rotation of the same shaft, and the crank can be actuated by defined angular steps by means of a third piston-and-cylinder unit.

This feature provides the advantage that the desired pivoting movement of the holding fixture can be implemented with extremely simple constructional means.

According to a preferred improvement of this variant of the invention, the piston rod of the third piston-and-cylinder unit is hinged at a lug at the free end of the crank, while its cylinder is pivotally connected to mounting means fixed rigidly on the work table.

This feature provides the advantage that the desired pivotal movement of the holding fixture can be achieved with the least number of machine elements in such a manner that the pivotal movement can be remote-controlled and, accordingly, integrated into the numerical control of a machining center.

It is further preferred in the case of this variant that a stop element is fixed to the shaft against relative rotation and that legs of the said stop element come to rest at a certain pressure against adjustable stops in certain predetermined rotary end positions of the shaft.

This feature provides the advantage that the holding fixture can be precisely adjusted in the desired end positions, without any expensive angle-measuring systems, as the pressure exerted in the contact position between the contact element and the stops guarantees always a defined end position, irrespective of the residual pressure exerted on the stops by the stop element.

According to a further preferred improvement of this variant of the invention, the stop element is enclosed in a bearing bush of the shaft and embedded in a lubricant of the shaft.

This integration of the stop mechanism in the bearing bush or the pillow block provides the advantage to exclude any faulty positions which might result in the case of exposed stops, for example if drilling or milling chips settle on the stops.

According to a particularly preferred embodiment of the invention, two holding fixtures are arranged on the work table and can be pivoted by means of common pivoting means, the work table being arranged for being pivoted about an axis arranged in parallel and at equal spacing to the center axes.

These features provide the considerable advantage that a tilting work table may at any time carry one wheel in a machining position in the working area of the spindle of the machining center, while the opposite position of the work table may serve as a mounting station. An operator of the device according to the invention may then remove a finished wheel from the holding fixture of the mounting station and mount a new wheel for the next machining operation. It goes without saying that these operations may be carried out also by an automatic handling system. Once the finished wheel has been withdrawn and the next wheel has been mounted in the holding fixture, the work table is pivoted by 180°, for example, when the machining operation performed on the wheel in the machining station has been completed, so that the operating steps described above can follow each other in direct succession. This permits extremely efficient utilization of the operating time of the machining center.

A particularly preferred variant of this embodiment of the invention distinguishes itself by the fact that the holding fixtures are arranged on mutually aligned shafts and that the axial spacing of adjacent ends of the shafts can be adjusted.

This feature provides the advantage of an additional adjusting facility which guarantees that every time the work table is pivoted, for example by 180°, the holding fixtures for the wheels are brought into exactly identical machining positions relative to the spindle of the machining center.

Other advantages of the invention will appear from the following description and the attached drawing.

It is understood that the features which have been described above and will be explained further below may be used not only in the described combinations, but also in any other combination or individually, without leaving the scope and intent of the present invention.

Certain embodiments of the invention will now be described in more detail with reference to the drawing in which:

FIG. 6 shows another section through the device according to FIG. 3, along line VI—VI in FIG. 3, likewise in enlarged scale; and FIG. 7 shows another section through the device according to FIG. 3, along line VII—VII in FIG. 3, likewise in enlarged scale.

Figure 1:
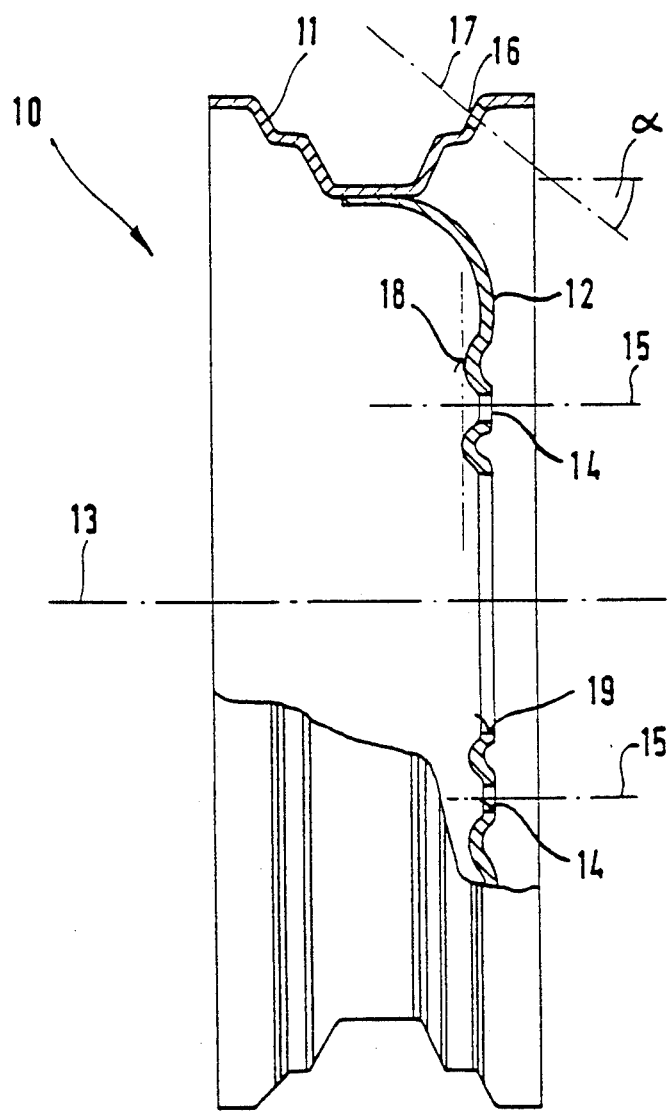
FIG. 1 shows a side view, partly broken away, of a wheel with its rim and wheel disk, and the necessary bores.

Referring now to FIG. 1, reference numeral 10 designates generally a wheel of a motor vehicle which, for the sake of clarity, is shown without tires. The wheel 10 consists in the usual manner of a rim 11 and a wheel disk 12 arranged about a first axis 13 of the wheel 10. The wheel disk 12 is provided with a plurality of, for example four or five, mounting bores 14 distributed over its periphery. The second axes 15 of the mounting bores 14 extend in parallel to the first axis 13 of the wheel 10.

The rim 11 is provided with a valve bore 16 arranged in the neighborhood of its outer periphery. The third axis 17 of the said valve bore 16 extends at an angle α relative to the first axis 13 of the wheel 10.

The mounting bores 14 serve for screwing the wheel 10—in a reference plane 18—to an axle flange of the motor vehicle by means of suitable screws or other mounting means. The axle flange is passed through a central opening 19 in the wheel disk 12. The valve bore 16 serves for accommodating the valve of a tire not shown in FIG. 1.

It goes without saying that the bores 14 and 15 mentioned before are described here by way of example only and that the invention extends of course also to other bores, for example centering bores or balancing bores intended for compensating a given imbalance of the wheel 10.

Figure 2:
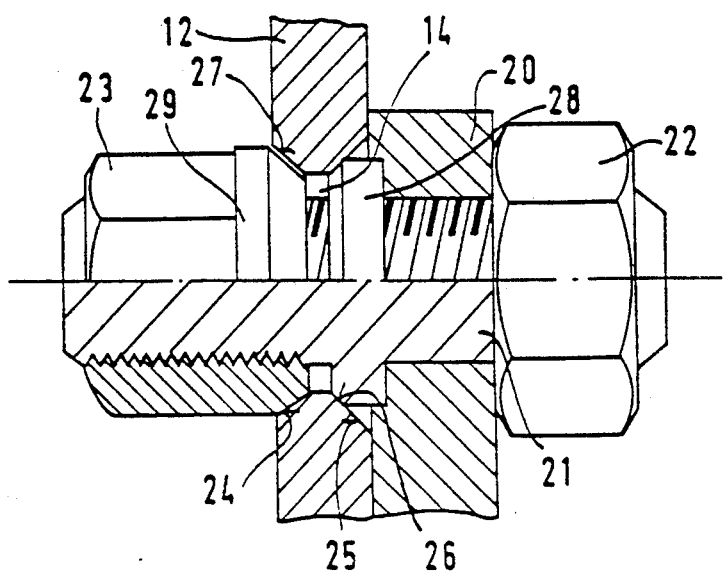
FIG. 2 illustrates, in enlarged scale, the manner in which a wheel is mounted on a motor vehicle according to the state of the art.

FIG. 2 shows an embodiment of the invention where the wheels 10 are fixed in a conventional manner to an axle flange 20 of the motor vehicle. Screwed connections of the illustrated type have been known before, for example from German Industrial Standard DIN 74 361.

The axle flange 20 is passed by a threaded bolt 21 which is fastened by a check nut 22 at the rear of the axle flange 20. A wheel nut 23 fitted on the other end of the threaded bolt 21 serves for fastening the wheel disk 12 of the wheel 10 on the axle flange 20.

The wheel disk 12 is provided with a first centering cone 24 in the area of the mounting bore 14, and with a second centering cone 25 at its front or rear side. The cones 24, 25 coact with a first counter-cone 26 and a second counter-cone 27 arranged at a shoulder 18 of the threaded bolt 21 and the rear face of the wheel nut 23, respectively.

The described arrangement ensures that the wheel 10 is automatically centered during the mounting operation on the axle flange 20.

For producing the mounting bores 14 and the valve bore 16 and, if necessary, still other bores, the present invention proposes the use of a device of the type that will be described hereafter with reference to FIGS. 3 to 7.

Figure 3:
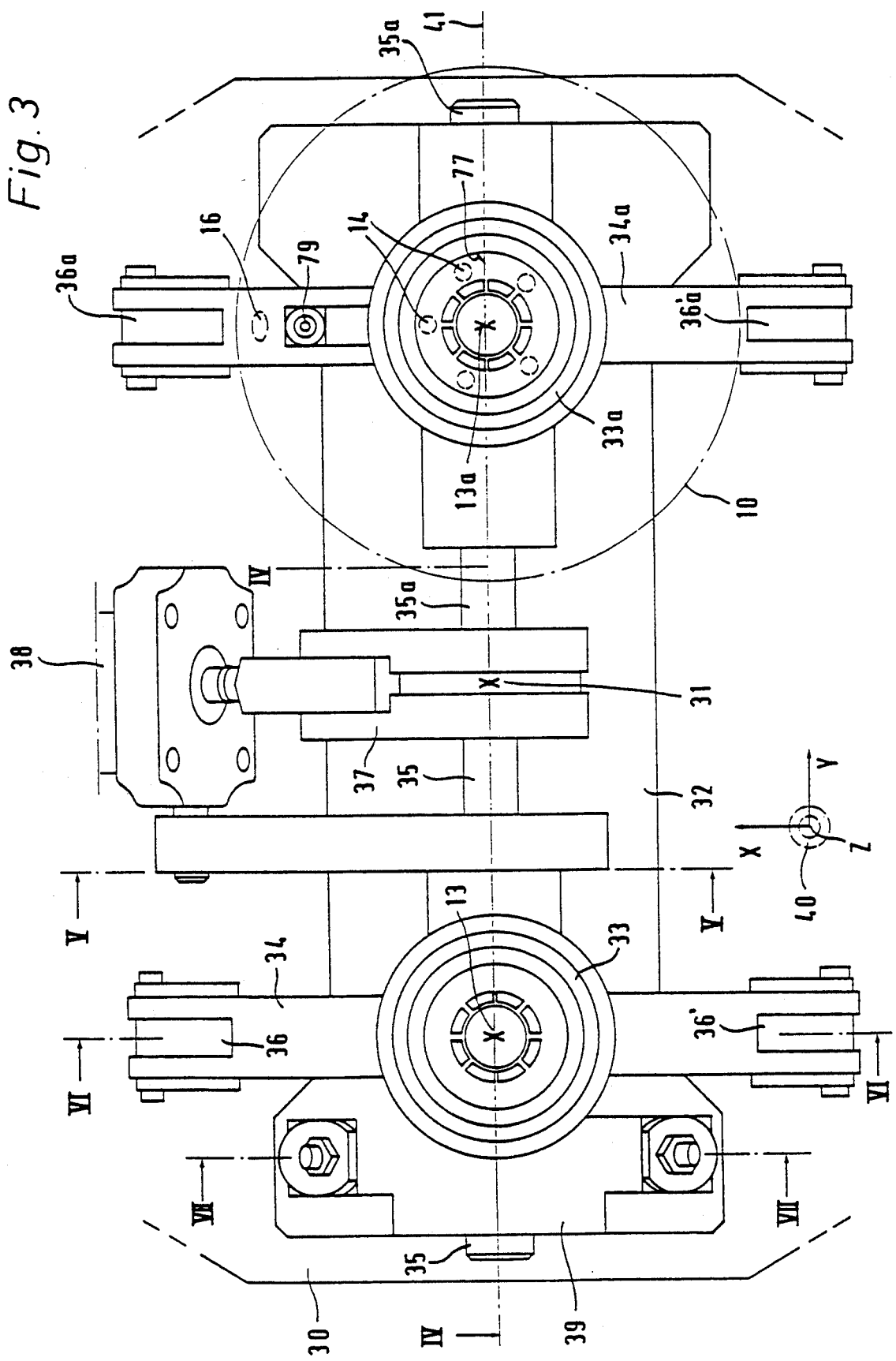
FIG. 3 shows a top view of one embodiment of a device according to the invention, with holding fixtures for wheels provided in tandem arrangement.

FIG. 3 shows a top view of a work table 30 of a machining center which is arranged for being pivoted about a horizontal axis 31, and this preferably in opposite directions by 180° each.

A work table 30 carries a base plate 32 on which two holding fixtures 33, 33a for the wheels 10 are mounted in symmetrical arrangement relative to the vertical axis 31. The holding fixtures 33 and 33a are arranged on tilting tables 34, 34a. The tilting tables 34, 34a are fixed against relative rotation on shafts 35, 35a which extend coaxially to each other and with their end faces arranged adjacent each other. The free ends of the tilting tables 34, 34a carry holding-down devices 36, 36' and 36a, 36a', respectively.

A crank 37 is connected against relative rotation with the shafts 35, 35a and is actuated by a first piston-and-cylinder unit 38.

The left free end of the shaft 35 carries a stop 36 which acts to limit the tilting movement of the tilting tables 34 and 34a.

A machining center, of which the work table 30 is a part, is indicated at 40. The tool 40 can be displaced along three Cartesian coordinates, with the x and y axes arranged in the drawing plane of FIG. 3, while the z axis extends perpendicularly thereto.

In one typical embodiment of the invention, the work table 30 is arranged in a horizontal plane and can be rotated about a vertical axis 31. Accordingly, the x and y axes extend in the horizontal plane, while z symbolizes a vertical spindle axis.

The longitudinal axis of the shafts 35 and 35a is indicated in FIG. 3 by reference numeral 41.

Figure 4:
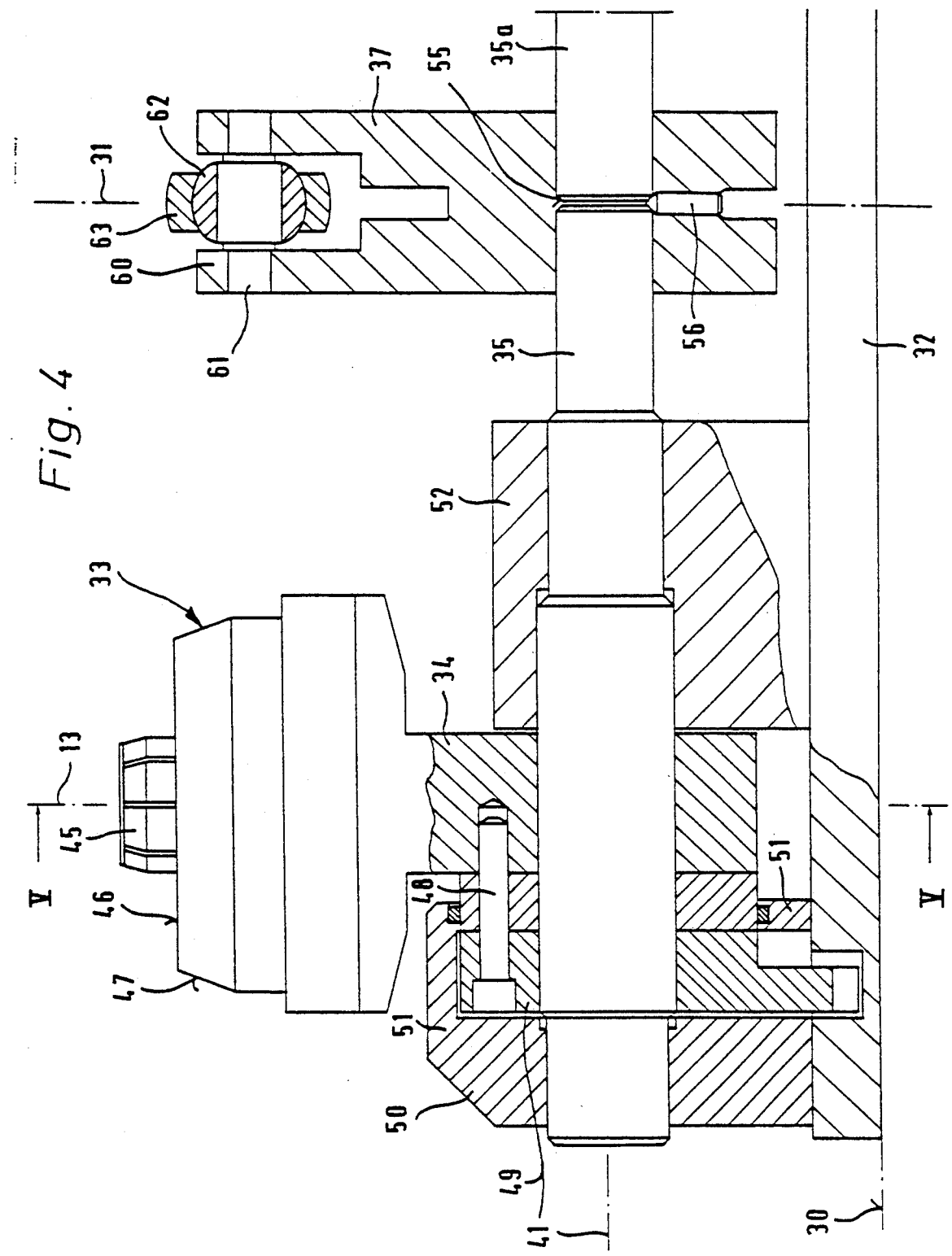
FIG. 4 shows a cross-section through part of the device shown in FIG. 3, along line IV—IV in FIG. 3, in enlarged scale.

FIG. 4 shows a partial sectional view taken along line IV—IV in FIG. 3 and, accordingly, a side view of the holding fixture 33.

The holding fixture 33 is provided with an expansion member 45 which projects axially from a radial reference surface 46, in the direction of the first axis 13 of the wheel 10. The reference surface 46 is followed by a downwardly opening conical portion 47. The dimensions of the reference surface 46, of the conical portion 47 and of the other components of the holding fixture 33 are adapted to the inner space of the wheel disk 12 of the wheel 10 being processed at any time.

The tilting table 34 is rigidly connected, by means of an axially extending screw 48, with a stop element 49 arranged to rotate in a first bearing bush 50. The bearing bush 50 constitutes simultaneously an enclosure 51 so that the stop element 49 is fully enclosed and embedded in the lubricant of the shaft 35.

The central area of the shaft 35 is rotatably seated in a second bearing bush 52, the bearing bushes 50 and 52 being arranged on both sides of the tilting table 34.

It can be seen in the right half of the illustration of FIG. 4 that the shafts 35, 35a extend along the same fourth axis 41 and have their end faces arranged immediately adjacent each other. The end faces are provided with chamfers 55, and the tip of an expansion pin 56 or an expansion screw is arranged in a manner to ensure that the shafts 35 and 35a are kept at a certain spacing relative to each other when being adjusted in the axial direction. This enables the positions of the holding fixtures 33 and 33a to be precisely adjusted relative to the vertical axis 31 so that the holding fixtures 33 and 33a will always occupy identical positions in the working area of the spindle of the machining center when the work tables 30 are tilted by 180° in either direction.

It can be further seen in the right half of FIG. 4 that the end portion of the crank 37 is formed by a fork-shaped free end 60 carrying a bolt 61 extending in parallel to the fourth axis 41. The bolt 61 is passed through a lug 62 provided on the free end of the piston rod 63.

Figure 5:
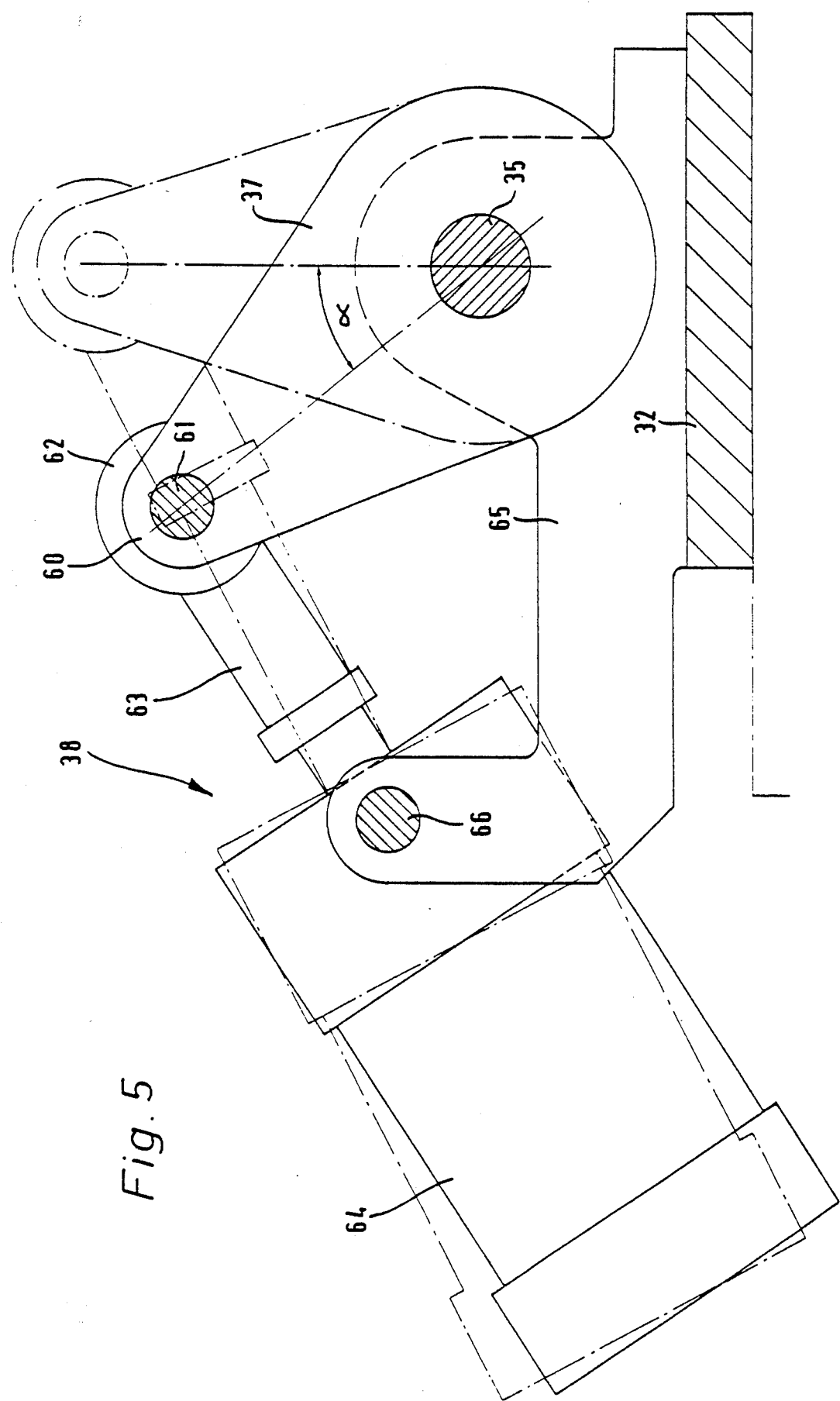
FIG. 5 shows a view of the device according to FIG. 3, in the direction of arrows V—V in FIG. 3, likewise in enlarged scale.

In FIG. 5 it can be seen in addition that the piston 63 is part of the first piston-and-cylinder unit 38. The cylinder 64 of the first piston-and-cylinder unit 38 is pivoted on mounting means 65, by means of a bolt 66, and the axes of the bolts 61 and 66 extend in parallel to the fourth axis 41 of the shaft 35.

The mounting means 65 in turn is connected to the base plate 32 in fixed relationship.

FIG. 6 shows additional details of the manner in which a wheel 10 is mounted on the holding fixture 33.

The holding fixture 33 comprises a second integrated piston-and-cylinder unit 70 whose sense of movement along the first axis 13 coincides with the center axis of the wheel 10. The free end of the second piston-and-cylinder unit 70 actuates an expansion cone 71 which, in the non-activated condition, passes through the central opening 19 of a wheel 10, which is positioned loosely on the holding fixture 33, either in form-locking engagement or with a certain play. When the second piston-and-cylinder unit 70 is operated, the expansion cone 71 will spread radially outwardly and is, thus, in a position to center the wheel 10 radially and axially, and to hold the wheel in the radial direction.

The tilting table 34 further comprises two third integrated piston-and-cylinder units 72 arranged in diametrical direction. One of these units 72 can be seen in FIG. 6. The third piston-and-cylinder unit 72 is provided on its free active end with a linkage 73 engaging the lower end of the holding-down device 36. The holding-down device 36 is arranged to pivot about a bolt 74 extending in parallel to the shaft 35.

Preferably, the holding-down device 36 is equipped with a contact element 75, for example a plastic part, by which the holding-down device 36 engages a rim flange 76 of the wheel 10 from the inside, or in the representation of FIG. 6 from above, when the reference plane 18 of the rim flange 76 has been positioned on the reference surface 46 of the holding fixture 33.

The holding fixture 33 is further provided, at a defined point of its periphery, with a radially projecting holder for an axial centering arbor 79 which engages a coacting defined opening 80 in the wheel disk 12 when the wheel 10 has been positioned correctly on the holding fixture 33.

A fluid, for example compressed air or a hydraulic fluid, can be admitted to the piston-and-cylinder units 70, 72 via fluid lines 81, 82. The fluid lines 81, 82 can be interconnected for common operation of the piston-and-cylinder units 70 and 72, and may be connected to a common supply and switching arrangement.

FIG. 7 finally shows certain details of the stop mechanism 39.

The stop element 49 ends at its bottom in two legs 85, 86 the free ends of which are provided with stop screws 87, 88. The first bearing bush 50 is likewise provided with stop screws 89 and 90, in the area of its transition to the base plate 32, so that a limited pivoting angle can be adjusted for the stop element 49 by corresponding adjustment of the stop screws 87 and 90. In the embodiment illustrated in FIG. 7, this pivoting angle corresponds to an angle $\alpha$ of, for example, 15°.

The mechanism illustrated in FIGS. 3 to 7 operates as follows:

The numerical control of the machine tool causes the work table 30, which carries all the components described before, to be tilted for example into the position illustrated in FIG. 3 in which the holding fixture 33a is located in the working area of the spindle—whereby a so-called machining side of the work table 30 is defined—, while the holding fixture 33 is then located on the so-called mounting side of the table, readily accessible for the user of the machining center.

In this position, the wheel 10 mounted on the holding fixture 33a is machined by the tool of the machining center indicated at 40. During this operation, one produces at first the five mounting bores 14, for example, which usually take the form of stepped bores with countersunk portions provided on both sides. During production of the mounting bores 14, the holding fixture 33a and the tilting table 34a occupy a position in which the reference surface 46 extends parallel to the surface of the work table 30 and, accordingly, perpendicularly to the z axis of the tool 40.

Upon completion of all five mounting bores 14 and, if necessary, of any coaxially extending additional bores, the first piston-and-cylinder unit 38 is actuated, and the piston rod 63 is retracted into the cylinder 64. This causes the crank 37 to move in counterclockwise direction—as viewed in FIG. 5—from its position indicated in dash-dotted lines to its position shown in full lines. The holding fixture 33 is thereby moved into the pivoted position illustrated in FIG. 6, in which the third axis 17 of the valve 16 extends in parallel to the z axis of the tool 40. By displacing the spindle appropriately, the tool 40 can now be brought into a machining position in which the tools are aligned with the valve bore 16 so that the valve bore 16 can now be produced in the described manner.

Once the valve bore 16, which extends at a certain angle relative to the center axis 13 of the wheel, has been finished, the piston-and-cylinder unit 38 is actuated once more to return the holding fixture 33 into its horizontally aligned initial position and to rotate the work table 30 about its vertical axis 31 by 180°.

Now, the second and third piston-and-cylinder units 70, 72 are actuated to lift the holding-down devices 36 and 36' off the rim flange 76 and to retract the expansion cone 72 in the radial direction so that the finished wheel 10 can be lifted off the holding fixture 33 in the axial direction.

The user of the machine tool may now mount the next wheel 10 on the free holding fixture 33. Due to the presence of the centering arbor 69, this can be done, however, only with the wheel 10 in one defined angular position in which the centering arbor 79 fits exactly into the matching opening 80 in the wheel disk 12 of the wheel 10.

When the wheel 10 is mounted on the holding fixture 33, its reference surface 18 comes into contact with the reference surface 46. By operation of a control and switching device not shown in the drawing, a pressure fluid is then again admitted through the fluid lines 81, 82 so that the contact elements 75 of the holding-down devices 36 and 36' engage the rim flange 76 from above. The expansion cone 71 is then expanded simultaneously, or with a slight delay, to retain the central opening 19 of the wheel 10 in form-locking and friction-locking engagement.

We claim:

1. An apparatus for machining wheel bolt bores and valve bores into a rim of a motor vehicle wheel, said wheel bolt bores extending in a direction essentially parallel to a wheel axis and said valve bores extending in a direction inclined thereto by a predetermined angle, the apparatus comprising:
   a base member defining a plane;
   a spindle stock means with a machining tool arranged therein said spindle stock means being displaceable along a first and second coordinate direction relative to said base member and parallel to said plane, and along a third coordinate direction perpendicular thereto;
   chucking means mounted on said base member for holding said rim during machining of said bores, said chucking means being provided with a reference surface for supporting a reference plane of said rim when held in said chucking means, said reference surface and said reference plane extending radially relative to said wheel axis, said chucking means including holding means for pressing said rim with said reference plane upon said reference surface, said holding means being pivotable about an axis extending in a parallel direction relative to said pivot axis and operable by means of a first piston-and-cylinder unit to engage said rim at a flange thereof located distant from said reference plane;
   swivel means for pivoting said chucking means about a pivot axis between a first position with said wheel bolt bores extending parallel to said third coordinate direction and into a second position with said valve bores extending parallel to said third coordinate direction.

2. An apparatus for machining wheel bolt bores and valve bores into a rim of a motor vehicle wheel, said wheel bolt bores extending in a direction essentially parallel to a wheel axis and said valve bores extending in a direction inclined thereto by a predetermined angle, the apparatus comprising:
   a base member defining a plane;
   a spindle stock means with a machining tool arranged therein said spindle stock means being displaceable along a first and second coordinate direction relative to said base member and parallel to said plane, and along a third coordinate direction perpendicular thereto;
   chucking means mounted on said base member for holding said rim during machining of said bores, said chucking means being provided with a reference surface for supporting a reference plane of said rim when held in said chucking means, said reference surface and said reference plane extending radially relative to said wheel axis, said chucking means including an expansion member projecting from said reference surface in a direction parallel to said wheel axis and engaging a central opening of said rim when mounted on said reference surface for fixing said rim radially and axially when said expansion member is in an expanded condition;
   swivel means for pivoting said chucking means about a pivot axis between a first position with said wheel bolt bores extending parallel to said third coordinate direction and into a second position with said valve bores extending parallel to said third coordinate direction.

3. An apparatus for machining wheel bolt bores and valve bores into a rim of a motor vehicle wheel, said wheel bolt bores extending in a direction essentially parallel to a wheel axis and said valve bores extending in a direction inclined thereto by a predetermined angle, the apparatus comprising:
   a base member defining a plane;
   a spindle stock means with a machining tool arranged therein said spindle stock means being displaceable along a first and second coordinate direction relative to said base member and parallel to said plane, and along a third coordinate direction perpendicular thereto;
   chucking means mounted on said base member for holding said rim during machining of said bores, said chucking means being provided with a reference surface for supporting a reference plane of said rim when held in said chucking means, said reference surface and said reference plane extending radially relative to said wheel axis, said chucking means being provided with axial openings arranged in said reference surface at positions aligned with said bores of said rim, when mounted in said chucking means, said openings having a radial cross-sectional area being bigger than a cross-sectional area of said bores;
   swivel means for pivoting said chucking means about a pivot axis between a first position with said wheel bolt bores extending parallel to said third coordinate direction and into a second position with said valve bores extending parallel to said third coordinate direction.

4. An apparatus for machining wheel bolt bores and valve bores into a rim of a motor vehicle wheel, said wheel bolt bores extending in a direction essentially parallel to a wheel axis and said valve bores extending in a direction inclined thereto by a predetermined angle, the apparatus comprising:
   a base member defining a plane;
   a spindle stock means with a machining tool arranged therein said spindle stock means being displaceable along a first and second coordinate direction relative to said base member and parallel to said plane, and along a third coordinate direction perpendicular thereto;
   chucking means mounted on said base member for holding said rim during machining of said bores, said chucking means including a centering bolt arranged parallel to said wheel axis and radially distant thereto, said centering bolt engaging a coacting axial opening in said rim for defining a rotary position of said rim relative to said chucking means;

swivel means for pivoting said chucking means about a pivot axis between a first position with said wheel bolt bores extending parallel to said third coordinate direction and into a second position with said valve bores extending parallel to said third coordinate direction.

5. An apparatus for machining wheel bolt bores and valve bores into a rim of a motor vehicle wheel, said wheel bolt bores extending in a direction essentially parallel to a wheel axis and said valve bores extending in a direction inclined thereto by a predetermined angle, the apparatus comprising:

a base member defining a plane;

a spindle stock means with a machining tool arranged therein said spindle stock means being displaceable along a first and second coordinate direction relative to said base member and parallel to said plane, and along a third coordinate direction perpendicular thereto;

chucking means mounted on said base member for holding said rim during machining of said bores, said chucking means being rigidly connected to a shaft, said shaft being aligned with said pivot axis, a crank being rigidly attached to said shaft and a third piston-and-cylinder unit being provided for rotating said crank about said pivot axis by predetermined angular steps;

swivel means for pivoting said chucking means about a pivot axis between a first position with said wheel bolt bores extending parallel to said third coordinate direction and into a second position with said valve bores extending parallel to said third coordinate direction.

6. An apparatus for machining wheel bolt bores and valve bores into a rim of a motor vehicle wheel, said wheel bolt bores extending in a direction essentially parallel to a wheel axis and said valve bores extending in a direction inclined thereto by a predetermined angle, the apparatus comprising:

a base member defining a plane;

a spindle stock means with a machining tool arranged therein said spindle stock means being displaceable along a first and second coordinate direction relative to said base member and parallel to said plane, and along a third coordinate direction perpendicular thereto;

two chucking means mounted on said base member for holding said rim during machining of said bores, said two chucking means being pivotable under the action of common swivel means, said base member being pivotable about an axis parallel to said third coordinate direction and in a central position between said two chucking means;

swivel means for pivoting said chucking means about a pivot axis between a first position with said wheel bolt bores extending parallel to said third coordinate direction and into a second position with said valve bores extending parallel to said third coordinate direction.

7. The apparatus of claim 2, wherein said expansion member is made operable by a second piston-and-cylinder unit.

8. The apparatus of claim 1, wherein said holding-down device and said first piston-and-cylinder unit are integrated into said chucking means for simultaneous pivoting therewith.

9. The apparatus of claim 1, wherein said chucking means comprise two holding-down devices, engaging said rim flange at two diametrically opposite positions.

10. The apparatus of claim 6, wherein said two chucking means are arranged on shafts, aligned with each other, an axial spacing of adjacent ends of said shafts being made adjustable.

11. The apparatus of claims 1 or 7, wherein means are provided for operating said first and said second piston-and-cylinder units in synchronism relative to each other.

12. The apparatus of claim 11, wherein said piston-and-cylinder units are connected to a common actuating fluid supply line.

13. The apparatus of claim 5, wherein a piston rod of said third piston-and-cylinder unit is hinged at a lug at a free end of said crank, a cylinder of said third piston-and-cylinder unit being pivotably connected to mounting means arranged rigidly on said base member.

14. The apparatus of claim 5, wherein a stop element is rigidly connected to said shaft for defining end positions of rotation of said shaft, said stop element having legs coming to rest with a predetermined pressure against adjustable stops in predetermined rotary end positions of said shaft.

15. The apparatus of claim 14, wherein said stop element is enclosed in a bearing bush of said shaft and is embedded in a lubricant of said shaft.

* * * * *